US010082076B2

(12) United States Patent
Tangirala et al.

(10) Patent No.: US 10,082,076 B2
(45) Date of Patent: Sep. 25, 2018

(54) ULTRA COMPACT COMBUSTOR HAVING REDUCED AIR FLOW TURNS

(71) Applicant: GENERAL ELECTRIC COMPANY, Schenectady, NY (US)

(72) Inventors: Venkat Eswarlu Tangirala, Niskayuna, NY (US); Narendra Digamber Joshi, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 198 days.

(21) Appl. No.: 14/706,679

(22) Filed: May 7, 2015

(65) Prior Publication Data

US 2015/0323184 A1 Nov. 12, 2015

Related U.S. Application Data

(60) Provisional application No. 61/989,855, filed on May 7, 2014.

(51) Int. Cl.
*F23R 3/04* (2006.01)
*F02C 3/14* (2006.01)
(Continued)

(52) U.S. Cl.
CPC ............... *F02C 3/14* (2013.01); *B23P 15/04* (2013.01); *F01D 9/023* (2013.01); *F02C 3/04* (2013.01);
(Continued)

(58) Field of Classification Search
CPC . F02C 3/14; F01D 9/02; F04D 29/542; F04D 29/544; F23R 3/002; F23R 3/04;
(Continued)

(56) References Cited

U.S. PATENT DOCUMENTS 2,930,192 A * 3/1960 Johnson ............... F23R 3/02
60/746
3,722,216 A * 3/1973 Bahr ................... F23R 3/14
60/737
(Continued)

FOREIGN PATENT DOCUMENTS

DE 19541303 A1 5/1997
EP 0340149 B1 5/1993
(Continued)

OTHER PUBLICATIONS

Strickland et al., "Numerical Simulations of a Lobed Fuel Injector", Physics of Fluids, vol. No. 10, Issue No. 11, pp. 2950-2964, Nov. 1998.

(Continued)

*Primary Examiner* — Steven Sutherland
(74) *Attorney, Agent, or Firm* — GE Global Patent Operation; John Darling

(57) ABSTRACT

Embodiments of a combustor for a gas turbine engine are provided herein. In some embodiments, a combustion chamber for a gas turbine engine comprising may include a combustor having an inner volume defined at least partially by a front wall, wherein the wall comprises a plurality of facets each having a through hole fluidly coupled to the inner volume, and wherein the plurality of facets are oriented such that an axis of each of the plurality of facets is offset from a central axis of the combustor by an angle.

6 Claims, 11 Drawing Sheets

(51) Int. Cl.
*F23R 3/14* (2006.01)
*F02C 3/04* (2006.01)
*F04D 29/54* (2006.01)
*B23P 15/04* (2006.01)
*F23R 3/00* (2006.01)
*F23R 3/34* (2006.01)
*F23R 3/44* (2006.01)
*F23R 3/12* (2006.01)
*F23R 3/26* (2006.01)
*F23R 3/28* (2006.01)
*F23R 3/50* (2006.01)
*F01D 9/02* (2006.01)
*F04D 27/02* (2006.01)
*F04D 29/56* (2006.01)

(52) U.S. Cl.
CPC ....... *F04D 27/0246* (2013.01); *F04D 29/542* (2013.01); *F04D 29/544* (2013.01); *F04D 29/563* (2013.01); *F23R 3/002* (2013.01); *F23R 3/04* (2013.01); *F23R 3/12* (2013.01); *F23R 3/14* (2013.01); *F23R 3/26* (2013.01); *F23R 3/28* (2013.01); *F23R 3/34* (2013.01); *F23R 3/44* (2013.01); *F23R 3/50* (2013.01); *F05D 2240/35* (2013.01); *Y10T 29/49323* (2015.01)

(58) Field of Classification Search
CPC ...... F23R 3/12; F23R 3/14; F23R 3/26; F23R 3/28; F23R 3/34; F23R 3/44; F23R 3/50
See application file for complete search history.

(56) References Cited

U.S. PATENT DOCUMENTS

| | | | | |
|---|---|---|---|---|
| 3,869,864 | A | * | 3/1975 | Bunn ........................ F23R 3/12 60/749 |
| 3,955,361 | A | * | 5/1976 | Schirmer .................. F23R 3/12 431/352 |
| 4,246,758 | A | * | 1/1981 | Caruel ...................... F23R 3/34 60/747 |
| 4,445,338 | A | | 5/1984 | Markowski et al. |
| 4,606,190 | A | * | 8/1986 | Greene .................. F23C 7/004 60/39.23 |
| 5,165,226 | A | * | 11/1992 | Newton .................... F23R 3/12 60/750 |
| 5,207,064 | A | | 5/1993 | Ciokajlo et al. |
| 5,613,363 | A | | 3/1997 | Joshi et al. |
| 5,619,855 | A | | 4/1997 | Burrus |
| 5,638,682 | A | | 6/1997 | Joshi et al. |
| 5,791,148 | A | | 8/1998 | Burrus |
| 5,857,339 | A | | 1/1999 | Roquemore et al. |
| 5,918,458 | A | | 7/1999 | Coffinberry et al. |
| 6,238,183 | B1 | | 5/2001 | Williamson et al. |
| 6,286,298 | B1 | | 9/2001 | Burrus et al. |
| 6,286,300 | B1 | | 9/2001 | Zelina et al. |
| 6,286,317 | B1 | | 9/2001 | Burrus et al. |
| 6,295,801 | B1 | | 10/2001 | Burrus et al. |
| 6,796,130 | B2 | | 9/2004 | Little et al. |
| 7,318,317 | B2 | | 1/2008 | Carrea |
| 7,762,058 | B2 | | 7/2010 | Pederson et al. |
| 8,272,219 | B1 | | 9/2012 | Johnson et al. |
| 8,511,087 | B2 | | 8/2013 | Fox et al. |
| 8,783,008 | B2 | | 7/2014 | Eroglu et al. |
| 8,801,267 | B2 | | 8/2014 | Gentgen |
| 2007/0036942 | A1 | * | 2/2007 | Steele ..................... F01D 25/12 428/131 |
| 2008/0092544 | A1 | | 4/2008 | Rakhmailov |
| 2010/0115953 | A1 | | 5/2010 | Davis, Jr. et al. |
| 2011/0067378 | A1 | | 3/2011 | Tibbott et al. |
| 2011/0079016 | A1 | | 4/2011 | Etemad et al. |
| 2012/0285173 | A1 | | 11/2012 | Poyyapakkam et al. |
| 2013/0086908 | A1 | | 4/2013 | Negulescu |
| 2013/0219853 | A1 | | 8/2013 | Little et al. |

FOREIGN PATENT DOCUMENTS

| | | |
|---|---|---|
| EP | 2011031278 A1 | 3/2011 |
| EP | 2011031279 A1 | 3/2011 |
| EP | 2011031280 A1 | 3/2011 |
| EP | 2011031281 A1 | 3/2011 |
| WO | 2007102807 A1 | 9/2007 |

OTHER PUBLICATIONS

Greenwood, "Numerical Analysis and Optimization of the Ultra Compact Combustor", Air Force Institute of Technology, Wright-Patterson AFB, Mar. 2005.

Zelina et al., "Operability and Efficiency Performance of Ultra-Compact, High Gravity (g) Combustor Concepts", Proceedings of ASME Turbo Expo '06: 51th ASME International Gas Turbine and Aeroengine Congress and Exposition, pp. 1-9, May 2006.

Jeschke et al., "A Novel Gas Generator Concept for Jet Engines Using a Rotating Combustion Chamber", Proceedings of ASME Turbo Expo 2013: Turbine Technical Conference and Exposition, San Antonio, Texas, USA, vol. No. 2, pp. 1-11, Jun. 3-7, 2013.

European Search Report and Written Opinion issued in connection with related EP Application No. 15196094.5-1607 dated May 11, 2016.

GE Related Case Form.

* cited by examiner

ULTRA COMPACT COMBUSTOR HAVING REDUCED AIR FLOW TURNS

CROSS REFERENCE TO RELATED APPLICATION

This patent application claims the benefit of priority, under 35 U.S.C. § 119, of U.S. Provisional Patent Application Ser. No. 61/989,855, filed May 7, 2014, titled "ULTRA COMPACT COMBUSTOR" the entire disclosure of which is incorporated herein by reference.

BACKGROUND

The subject matter disclosed herein generally relates to gas turbine engines, and more specifically, to components of combustors.

Conventional gas turbine engines typically include a number of components configured to direct a flow of air and/or fuel in a desired direction to facilitate operation of the gas turbine engine. For example, as the air and/or fuel flows from one section of the gas turbine engine to the next, the orientation of the flow path may be changed ("turned") via or more guide vanes, nozzles, or the like. However, the inventors have observed that redirecting the air/fuel in such a manner introduces inefficiencies into the operation of the gas turbine engine. Moreover the inclusion of the aforementioned components adds weight, cost, and complexity to the gas turbine engine.

Therefore, the inventors have provided an improved gas turbine engine.

SUMMARY

Embodiments of a combustor for a gas turbine engine are provided herein. In some embodiments, a combustion chamber for a gas turbine engine comprising may include a combustor having an inner volume defined at least partially by a front wall, wherein the wall comprises a plurality of facets each having a through hole fluidly coupled to the inner volume, and wherein the plurality of facets are oriented such that an axis of each of the plurality of facets is offset from a central axis of the combustor by an angle.

In some embodiments, a gas turbine engine may include a compressor having an exit end; a diffusor disposed downstream of the exit end of the compressor; and a combustor disposed downstream of the diffusor, the combustor having an inner volume defined at least partially by a wall, wherein the wall comprises a plurality of facets each having a through hole fluidly coupled to the inner volume, and wherein the plurality of facets are oriented such that an axis of each of the plurality of facets is offset from a central axis of the combustor by an angle.

In some embodiments, a combustion chamber for a gas turbine engine may include a compressor having an exit end; a combustor having an inner volume defined at least partially by a wall, wherein the wall comprises a plurality of facets each having a through hole fluidly coupled to the inner volume, and wherein the plurality of facets are oriented such that an axis of each of the plurality of facets is offset from a central axis of the combustor by an angle that is substantially similar to an angle of air flow provided by the exit end of the compressor.

The foregoing and other features of embodiments of the present invention will be further understood with reference to the drawings and detailed description.

DESCRIPTION OF THE FIGURES

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of the invention and are therefore not to be considered limiting in scope, for the invention may admit to other equally effective embodiments.

To facilitate understanding, identical reference numbers have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of a gas turbine engine are disclosed herein. In at least some embodiments, the inventive gas turbine engine may reduce or eliminate one or more components typically utilized to direct a flow of air and/or fuel in a desired direction to facilitate operation of the gas turbine engine, thereby reducing cost, weight and complexity of the gas turbine engine. In addition, in at least one embodiment, the inventive gas turbine engine may include a vortex cavity that advantageously provides a helical flow of a fuel/air mixture throughout the vortex cavity and combustion chamber, thereby providing an improved and more efficient mixing and ignition of the fuel/air mixture and, thus, increasing the efficiency of the gas turbine engine. While not intending to be limiting, the inventors have observed that the inventive components of the gas turbine engine disclosed herein may be particularly suitable for use in combustors.

Figure 1:
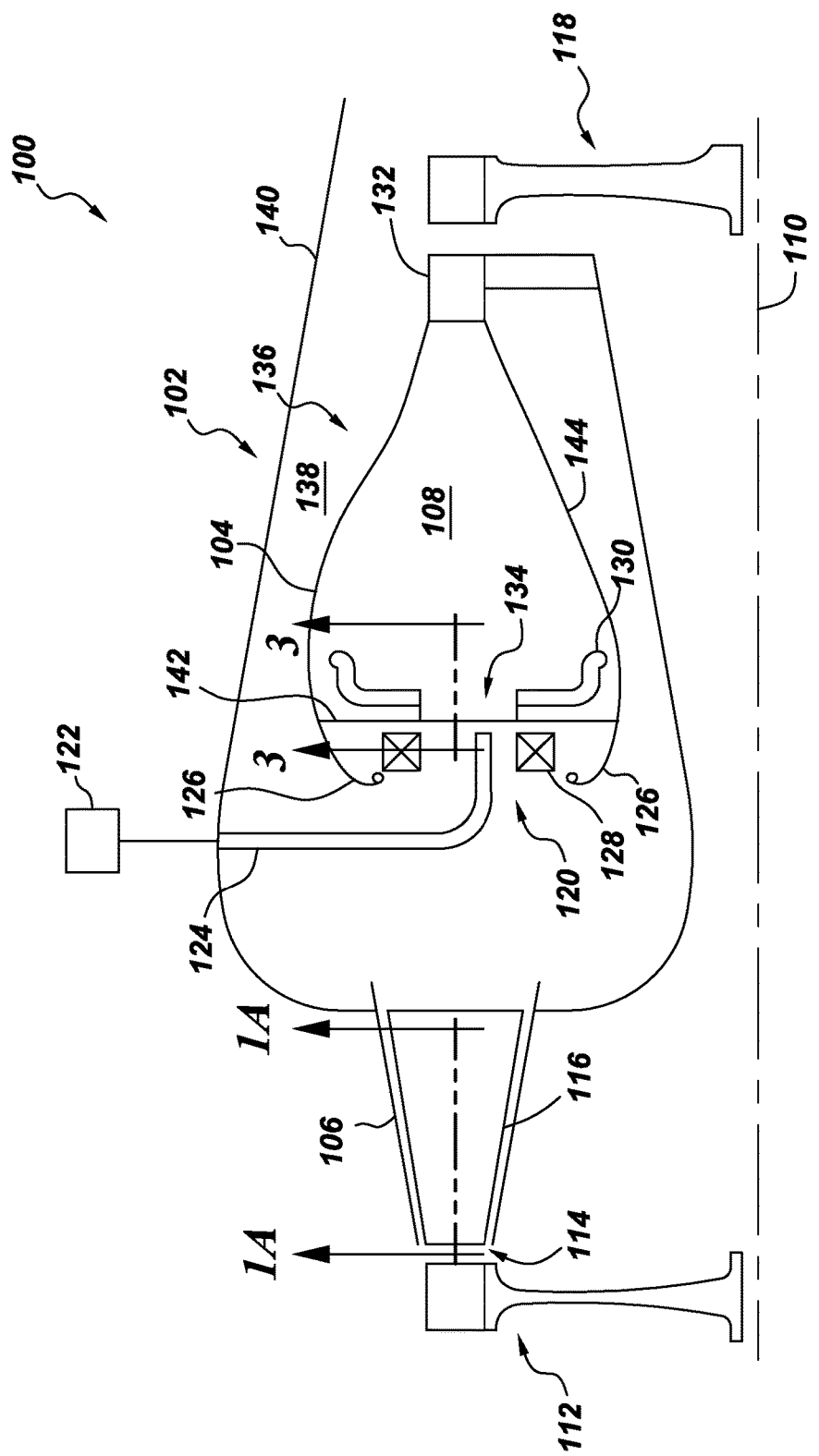
FIG. 1 is a cross sectional view of a portion of a conventional gas turbine engine combustion system.

Referring to FIG. 1, in some embodiments, a conventional gas turbine engine combustion system (combustion system) 100 generally includes a combustion chamber 102 having an inner liner 144 and an outer liner 104 that at least partially defines a combustor 108. In some embodiments a casing 140 may be disposed about the outer liner 104. When present the casing 140 and an outer portion 136 of the outer liner 104 may form an outer passage 138. Although only a portion is shown, it is to be understood that the combustion chamber 102 may be annular in form, for example about an axis 110.

In some embodiments, air is directed into the combustion system 100 via an intake that includes, for example, one or more fans, compressors, or the like (e.g., partial view of compressor rotor 112 shown). The air flows from the intake, via an exit end 114 of the compressor and through a diffuser 106. The diffusor 106 is configured to direct the air towards the combustion chamber 108. In some embodiments, one or more guide vanes or struts (e.g., such as collectively shown at 116) may be disposed within the diffusor 106 and/or proximate the exit end 114 of the compressor.

In some embodiments, an inlet module 120 comprising a cowl 126 may be disposed about a through hole 134 formed in a front wall 142 of the combustion chamber 108 and configured to direct the air from the diffusor 106 to an inner volume of the combustion chamber 108. Although only one inlet module 120, cowl 126 and through hole 134 are shown in the figure, multiples of each may be present.

In some embodiments, one or more swirlers 128 may be disposed proximate the through hole 134 to facilitate mixing of the air and a fuel provided by a fuel source 122 via a fuel injector 124 for ignition and combustion. In some embodiments, a splash plate 130 may be disposed within the combustion chamber 108 to reduce instances of damage to portions of the front wall 142 caused by increased temperatures resulting from ignition of the fuel/air mixture.

In some embodiments, following ignition, the air is directed out of the combustion chamber 108 and towards one or more turbines (e.g., partial view of one turbine rotor 118 shown) via a turbine nozzle 132 (stage one nozzle). When present, the turbine nozzle 132 functions to direct a flow of the air at a desired angle in a desired flow path. In some embodiments, the turbine nozzle 132 may include a plurality of through holes that allows a flow of cooling air to prevent heat induced damage (e.g., deformation, melting, or the like) to the turbine nozzle 132. Although only one turbine is shown, it is to be understood that more than one may be present, for example such as one or more low pressure turbines, high pressure turbines, or the like.

Figure 1A:
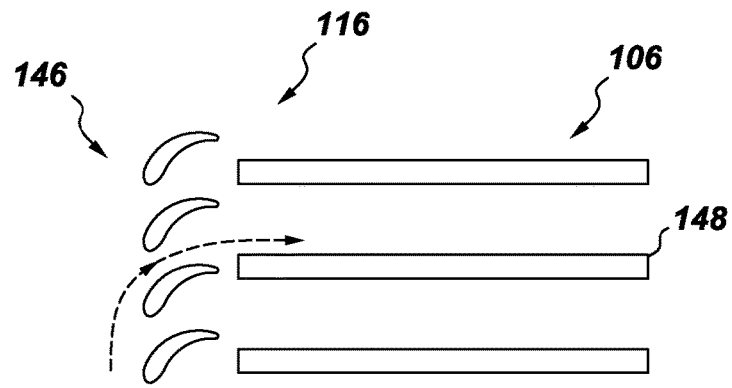
FIG. 1A is a cross sectional view of a portion of the combustion system shown in FIG. 1

The inventors have observed that conventional combustors typically include a number of mechanisms to direct air flow between components to facilitate an efficient use of such air. For example, referring to FIG. 1A the diffusor 106 may include at least one of outlet guide vanes 146, aerodynamically shaped struts 148, or the like, to alter an angle of the air flow, reduce or eliminate a swirling component of the air flow and/or direct a desired portion of the air towards the inlet module 120 of the combustion chamber 108 (exemplary air flow shown in phantom). However, the inventors have observed that directing the air flow in such a manner results in a high pressure drop and losses in air flow, thereby reducing efficiency of the gas turbine engine (e.g., reduced Brayton cycle efficiency). Moreover, inclusion of the components needed to facilitate directing the air flow (e.g., the one or more guide vanes) adds cost and complexity to the combustion chamber 102.

Figure 2:
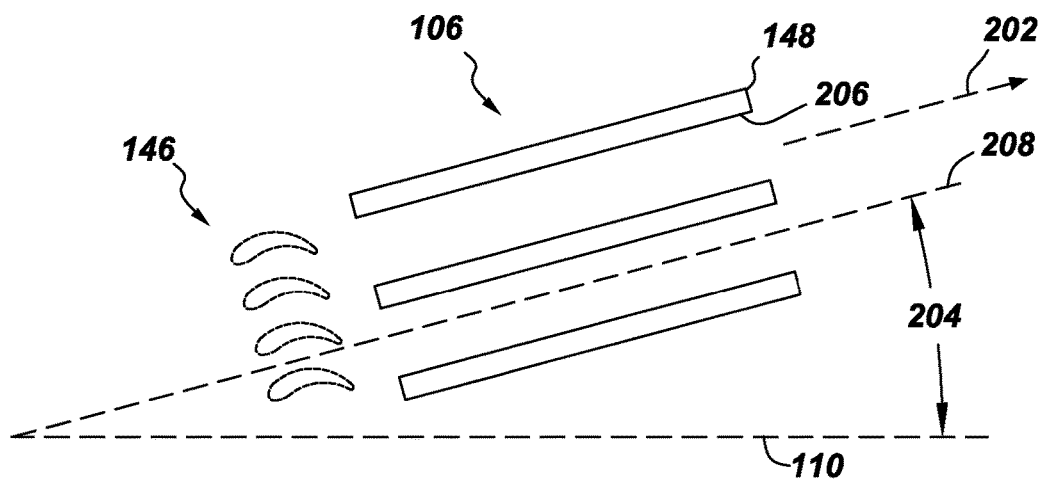
FIG. 2 is a cross sectional view of a portion of the combustion system shown in FIG. 1 in accordance with some embodiments of the present invention.

As such, referring to FIG. 2, in some embodiments the diffusor 106 may be configured having an inner surface 206 and/or struts 148 angled such that the flow of air flowing through the diffusor 106 flows in a desired flow path. In some embodiments, the angle 204 may be substantially similar to a swirl angle of a flow of air as it exits the exit end 114 of the compressor 112. For example, in some embodiments, the diffusor 106 may be configured such that a central axis 208 of the diffusor is offset from the central axis 110 of the combustion chamber 102 by an angle 204, thereby providing a flow path 202 that is parallel to a central axis 208 of the diffusor 106. The angle 204 may be any angle suitable to direct the flow of air in a desired flow path, for example, such as about 15 degrees to about 60 degrees, or in some embodiments, about 15 degrees to about 45 degrees.

By configuring the diffusor 106 as shown in FIG. 2 the inventors have observed that components that would otherwise be present in the diffusor (e.g., the outlet guide vanes 146) may be eliminated, thereby reducing complexity and length of the diffusor. In addition, by eliminating the outlet guide vanes 146 the swirling component of the airflow may be maintained, thereby decreases losses in airflow that otherwise occurs when removing the swirling component in conventional turbine engines. Moreover, the pressure drop typically observed in conventional combustors may be reduced, thereby also decreasing losses in the air flow and increasing the efficiency of the gas turbine engine.

The inventors have observed that conventional combustion chambers typically include one or more through holes and inlet modules disposed on a singular surface (front wall) of the combustion chamber, for example such as described above with respect to FIG. 1. However, because of the orientation of the front wall of the combustion chamber, the flow path of the air typically needs to be altered to facilitate a desired flow of air into the combustion chamber.

Figure 3:
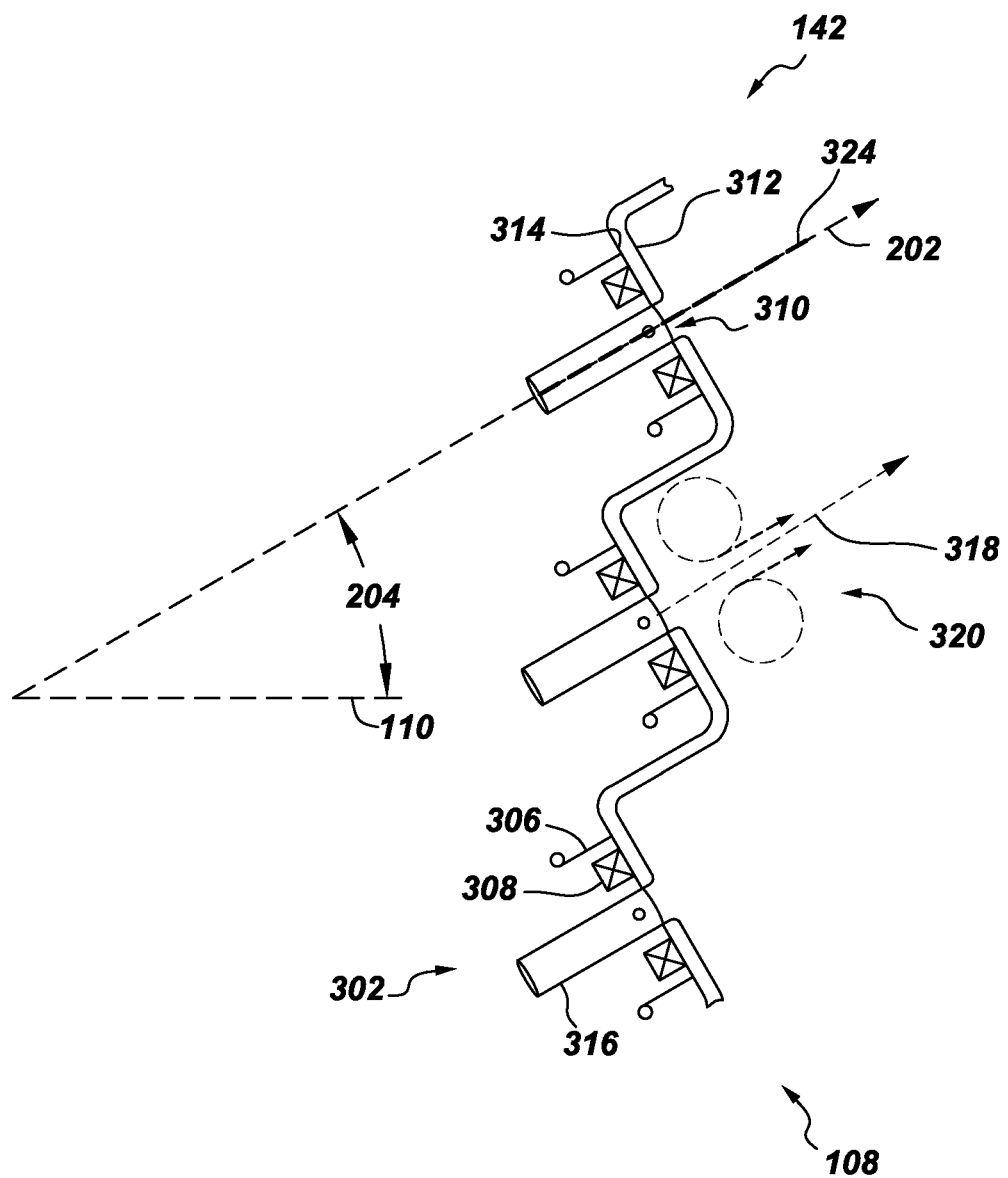
FIG. 3 is a cross sectional view of a portion of the combustion system shown in FIG. 1 in accordance with some embodiments of the present invention.

As such, referring to FIG. 3, in some embodiments, the front wall 142 of the combustor 108 may comprise a plurality of faces (facets) 302 that are positioned or oriented to receive the flow of air at a desired angle. The plurality of faces 302 may be positioned in any manner to receive the air flow such as the corrugated or step-like configuration shown in FIG. 3. For example, in some embodiments, each of the plurality of faces 302 may be oriented such that an axis 324 of each of the plurality of faces (facets) 302 is offset from a central axis of the combustor by a desired angle (e.g., angle 204). The desired angle may be any angle, for example, such as about 15 degrees to about 60 degrees, or in some embodiments, about 15 degrees to about 45 degrees. For example, in some embodiments, each of the faces 302 may be positioned such that the faces 302 are substantially perpendicular to the air flow 202 provided by the diffusor 106. In such embodiments, the angle 204 may be substantially similar to a swirl angle of a flow of air as it exits the exit end 114 of the compressor 112.

The inventors have observed that by providing the plurality of faces 302, the flow of air follows the flow path 202 dictated by the diffusor (described in FIG. 2) thereby further reducing the need to alter the direction of the flow of air, thus eliminating the need for additional components (e.g., outlet guide vanes, etc.) that would otherwise be present in conventional configurations.

In some embodiments, each face or facet 302 may comprise a through hole 310, one or more air swirlers 308 and one or more guide vanes 306. In some embodiments, a splash plate (e.g., such as the splash plate 142 shown in FIG. 1) may be disposed on an interior surface 314 of each of the faces 302. In some embodiments, fuel may be provided proximate each face 302 via a fuel injector 316. In operation, the air and fuel mixture may be ignited via an igniter (not shown) proximate the splash plate 312 and subsequently flow into the combustion chamber (ignition and subsequent flow indicated at 320 and 318 respectively).

Figure 4:
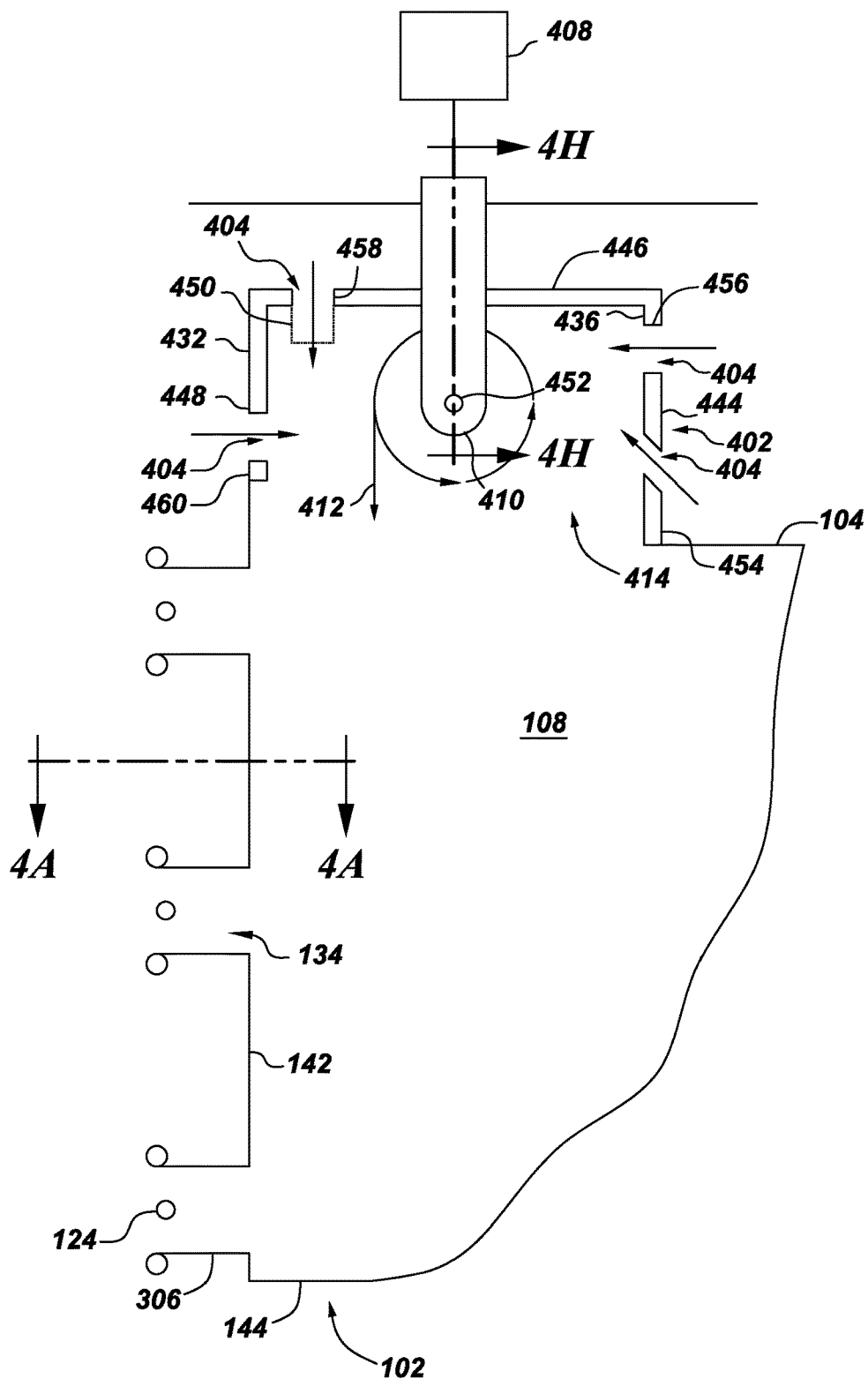
FIG. 4 is a cross sectional view of a portion of a combustion system in accordance with some embodiments of the present invention.

Referring to FIG. 4, in some embodiments, the combustion chamber 102 may comprise a vortex cavity (cavity) 402 fluidly coupled to the combustor 108. When present, the vortex cavity 402 may function to provide a desired air/fuel mixture in a desired distribution and to stabilize a flame formed by the ignited air/fuel mixture. Although only one vortex cavity 402 is shown in the figure, any number of vortex cavities suitable to provide a desired air/fuel mixture in a desired distribution and to stabilize a flame formed by the ignited air/fuel mixture may be present.

Figure 4A:
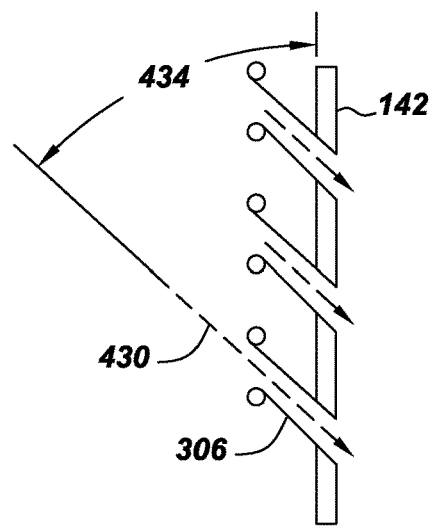
FIG. 4A is a cross sectional view of a portion of the combustion system shown in FIG. 4 in accordance with some embodiments of the present invention.

Although shown as a singular front wall 142 in FIG. 4, the front wall 142 may be configured to have a plurality of faces or facets, such as described above with respect to FIG. 3. Alternatively, in some embodiments, the guide vanes 306 may be configured such that a central axis 430 of the guide vanes 306 may be offset from the front wall 142 by an angle 434, for example, such as shown in FIG. 4A. The angle 434 may be any angle sufficient to accommodate for a flow of air directed towards the combustor (e.g., from the diffusor discussed above).

Referring to FIG. 4, the vortex cavity 402 generally comprises a plurality (e.g., three) of sides 432 and an open end 414 that is in fluid communication with the combustor 108. Although the three sides 432 are shown as connected at an angle, in some embodiments, one or more inner surfaces 436 between the sides 432 may be rounded. When present, the rounded inner surfaces may function to reduce mechanical or thermal stresses within the vortex cavity 402 and/or may eliminate areas having a trapped flow (e.g., eddy flow) or no flow.

In some embodiments, a plurality of through holes (injection holes) 404 (four shown) may be formed in at least one of the sides 432 of the vortex cavity 402. When present, the plurality of injection holes 404 directs a flow of air into vortex cavity 402 to facilitate the formation of the vortex 412. The injection holes 404 may be configured in any manner suitable to facilitate, for example, the creation of the vortex 412, a desired vortex shape, fuel/air mixture, movement of the vortex flow into the combustion chamber 108, or the like. In addition, in any of the embodiments described herein, the injection holes 404 may include a mechanism (shown in phantom at 450), for example, such as a nozzle or the like to facilitate varying one or more flow characteristics (flow rate, pressure, direction or the like) through the injection holes 404. Moreover, although shown in the cross sectional views as at least substantially circular, it is to be understood that the injection holes 404 may have any shape, for example such as slotted holes or the like, suitable to provide a desired air flow.

Figure 4B:
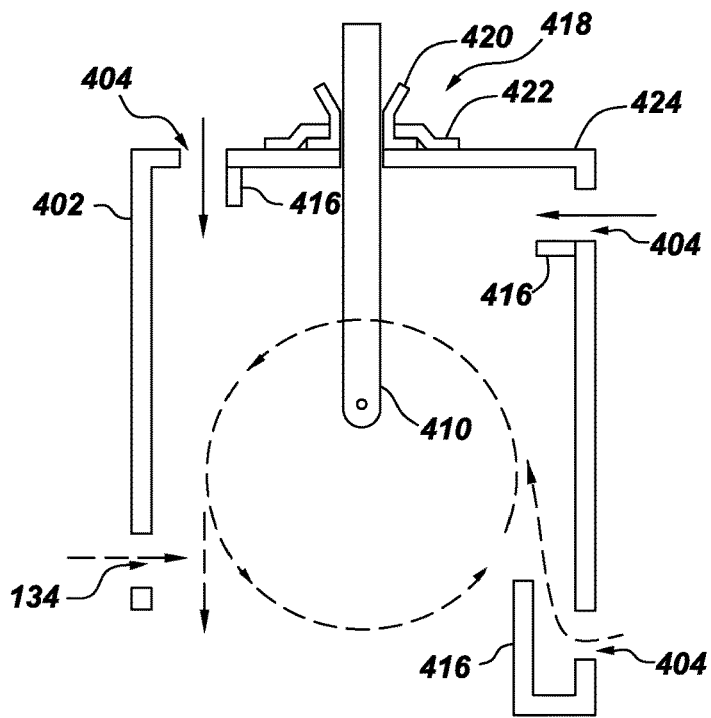
FIGS. 4B-G are cross sectional views of a portion of the combustion system shown in FIG. 4 in accordance with some embodiments of the present invention.

Referring to FIG. 4B, in some embodiments, the vortex cavity 402 may include one or more protrusions (three protrusions 416 shown) extending into the vortex cavity 402 to direct the flow of air about the vortex cavity 402 in a circular flow path to further facilitate the formation of the vortex 412, for example, such as shown in the figure. In some embodiments, the vortex cavity 402 may further comprise a fuel injection assembly 418 configured to facilitate the insertion of a fuel injector 410 into the vortex cavity 402. In some embodiments, the fuel injection assembly 418 may generally comprise a collar 422 coupled to an outer surface 424 of the vortex cavity 402 and a guide 420 disposed within the collar 422.

Figure 4C:
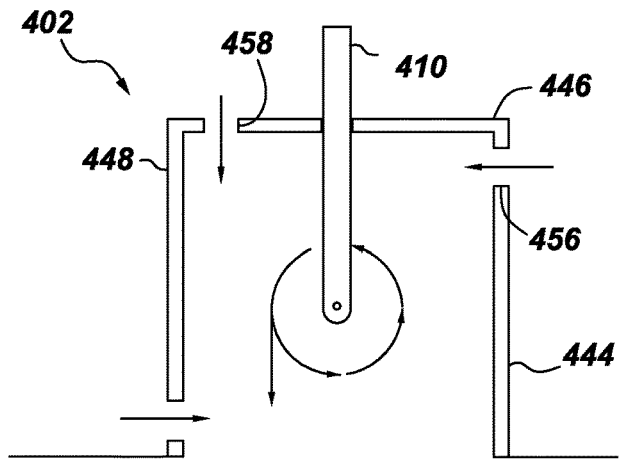
Figure 4D:
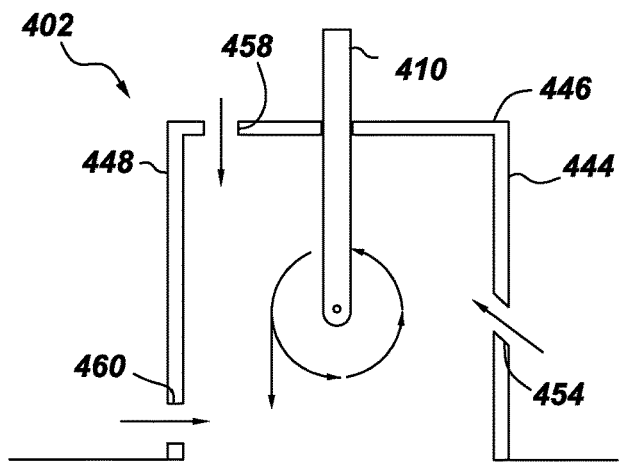
Figure 4E:
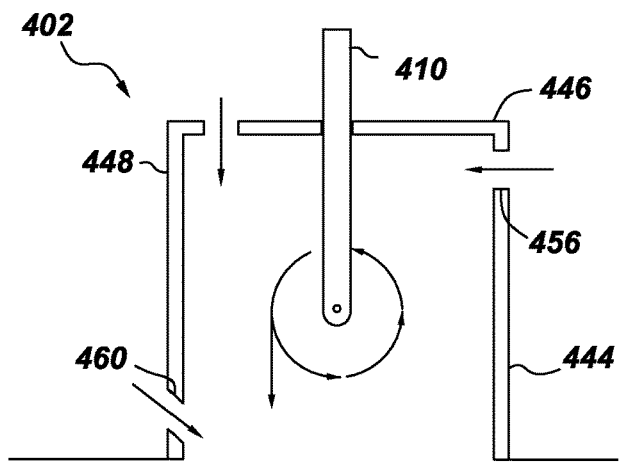
Figure 4F:
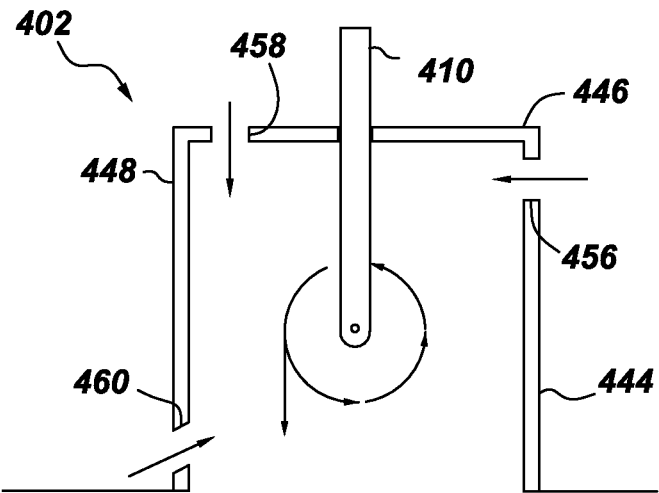

Referring back to FIG. 4, a fuel source 408 provides fuel to the vortex cavity 402 via the fuel injector 410 disposed within the vortex cavity 402. The fuel injector 410 provides the fuel from the fuel source 408 to the via a fuel injector hole 452. In some embodiments, the fuel injector 410 may comprise a mechanism (shown in phantom at 462 of FIG. 4H) disposed in or about the fuel injector hole, for example, such as a nozzle or the like to facilitate providing the fuel and/or varying one or more flow characteristics (flow rate, pressure, direction or the like) of the fuel. In some embodiments, the fuel injector 410 is disposed within the vortex cavity 402 such that an axis 464 of the fuel injector hole 452 is parallel to a tangential component 466 of the vortex cavity 402, for example, such as shown in FIG. 4H. Disposing the fuel injector 410 in such a manner allows for fuel injector 410 to provide the fuel in a flow path that is generally tangential (e.g., in a direction of the axis 464 of the fuel injector hole 452) to the vortex cavity 402. The inventors have observed that providing the fuel in such a manner may at least partially facilitate a movement of the fuel/air moisture in a helical path through the vortex cavity 402.

In some embodiments, configurations of the injections holes 404 may include varied placement, number or directionality/angle of each injection hole with respect to the vortex cavity 402. In addition, a flow rate through each of the injection holes 404 may be varied independently. The inventors have observed that varying such flow rate, placement, number or directionality of the injection holes may provide a mechanism to facilitate formation of the vortex and/or forming the vortex or flow of air having desired characteristics. For example, directing flow towards the combustion chamber 108 or increasing a flow rate of the air towards the combustion chamber 108 may facilitate directing the vortex flow to the combustion chamber 108 (vortex transport), thereby moving a point of combustion towards the combustion chamber 108. In another example, directing flow towards a top or closed end of the vortex cavity 402 or parallel with the top of the vortex cavity 402 may facilitate the formation or increase a rotational component of the vortex 412, thereby facilitating a desired mixing of the fuel and air.

In addition to the above, in some embodiments, one or more of the through holes 404 may be configured such that a flow path of air 426 provided by the through holes 404 may have a tangential component 470 and a radial component 468. As used herein, "radial" may refer to directions that are radially inward or outward with respect to a center of an annular shape of the cavity 402 or combustor 108 and "tangential" may refer to a tangential direction at any point about of the annular shape of the cavity 402 or combustor 108. The inventor have observed that providing the air via the through holes 404 in such a manner may function to reduce or eliminate a need to further turn the air flow as it exits the combustion chamber 108. Eliminating the need to further turn the air flow allows for a reduction of a length, or in some instances, elimination, of a turbine nozzle (first stage nozzle) that would otherwise be required to turn the air flow.

An exemplary illustration of an exemplary helical path resulting from the flow path 426 of air provided by the plurality of injection holes 404 or the plurality of injection holes 404 in combination of the flow path 428 of fuel provided by the fuel injector 410 is shown in FIG. 4H. The inventors have observed that the helical flow of air/fuel may advantageously provide an improved and more efficient mixing and ignition of the fuel/air mixture and, thus, increasing the efficiency of the gas turbine engine. Moreover, the inventors have observed that the helical flow of air/fuel may advantageously providing a desired distribution of the fuel/air mixture throughout the combustion chamber 108, thereby further increasing the efficiency of the gas turbine engine. In addition, the inventors have observed that the helical flow of air/fuel may advantageously accommodate for a pressure gradient formed within the combustion chamber 108 (e.g., caused by an area of high pressure proximate the outer liner 104 and an area of low pressure proximate the inner liner 144), thereby further providing the aforementioned advantages.

FIGS. 4 and 4B-G depict exemplary illustrative embodiments of various configurations of the injection holes 404. Although a number of injection holes are depicted in the cross sectional views of the vortex cavity of FIGS. 4 and 4A-G, it is to be understood that injection holes may be provided throughout the vortex cavity 402, for example such as shown in FIG. 4H. In addition, although shown as separate configurations, multiple configurations, or combination of the illustrated configurations may be utilized throughout the vortex cavity 402.

In one example, in some embodiments, the vortex cavity 402 may include a first side (aft) 444 of the vortex cavity 402 having a plurality of injection holes 404 (e.g., injection hole 454 and injection hole 456), a second side (top or closed end) 446 having an injection hole 458 and a third side (fore) 448 having an injection hole 460, for example, such as shown in FIG. 4. In such embodiments, each of the injection holes 404 may be configured to provide a desired directionality of air flow to facilitate, for example, formation of the vortex 412, movement of the vortex 412, or the like. For example, a first injection hole (injection hole 454) of the first side 444 may be configured such that an flow is directed parallel to the top 446 of the vortex cavity 402 and a second injection hole (injection hole 456) of the first side 444 may be configured such that an air flow is directed generally towards the top 446 of the vortex cavity 402. In addition, the injection hole 458 of the top 446 may be configured such that an air flow is directed generally towards the combustion chamber 108 and the injection hole 460 of the third side 448 may be configured such that an air flow is directed parallel to the top 446 of the vortex cavity 402. FIG. 4C depicts an exemplary configuration of the vortex cavity 402 that is similar to the configuration shown in FIG. 4, however, without the first injection hole (injection hole 454) of the first side 444 of the vortex cavity 402. FIG. 4D depicts an exemplary configuration of the vortex cavity 402 that is similar to the configuration shown in FIG. 4, however, without the second injection hole (injection hole 456) of the first side 444. FIG. 4E depicts an exemplary configuration of the vortex cavity 402 that is similar to the configuration shown in FIG. 4C, however, having the injection hole 460 of the third side 448 configured such that an air flow is directed towards the combustion chamber 108. FIG. 4F depicts an exemplary configuration of the vortex cavity 402 that is similar to the configuration shown in FIG. 4C, however, having the injection hole 460 of the third side 448 configured such that an air flow is directed towards the top 446 of the vortex cavity 402.

Figure 4G:
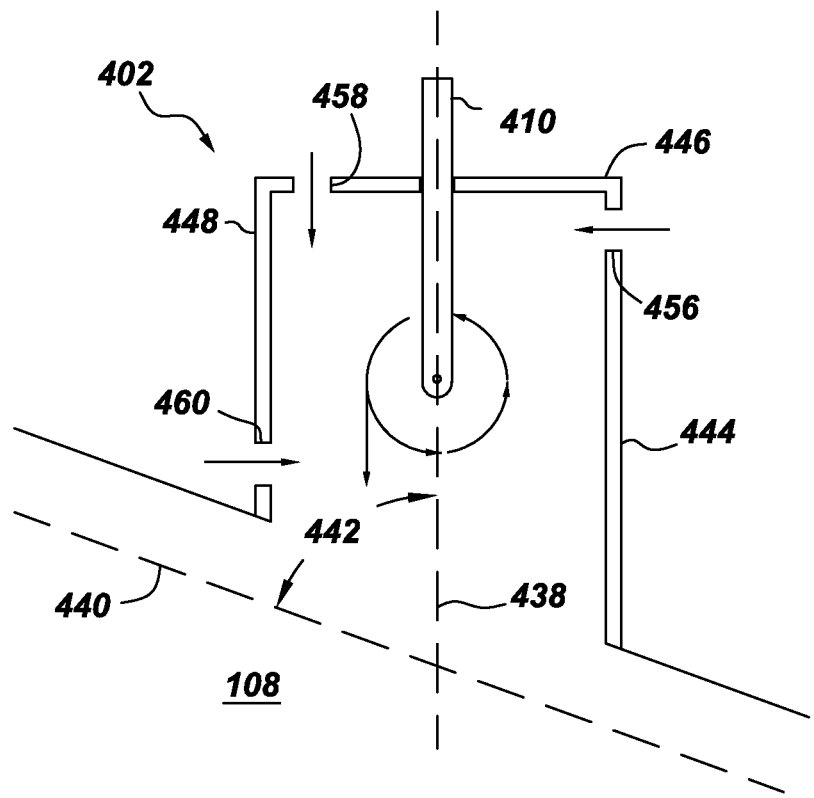
Figure 4H:
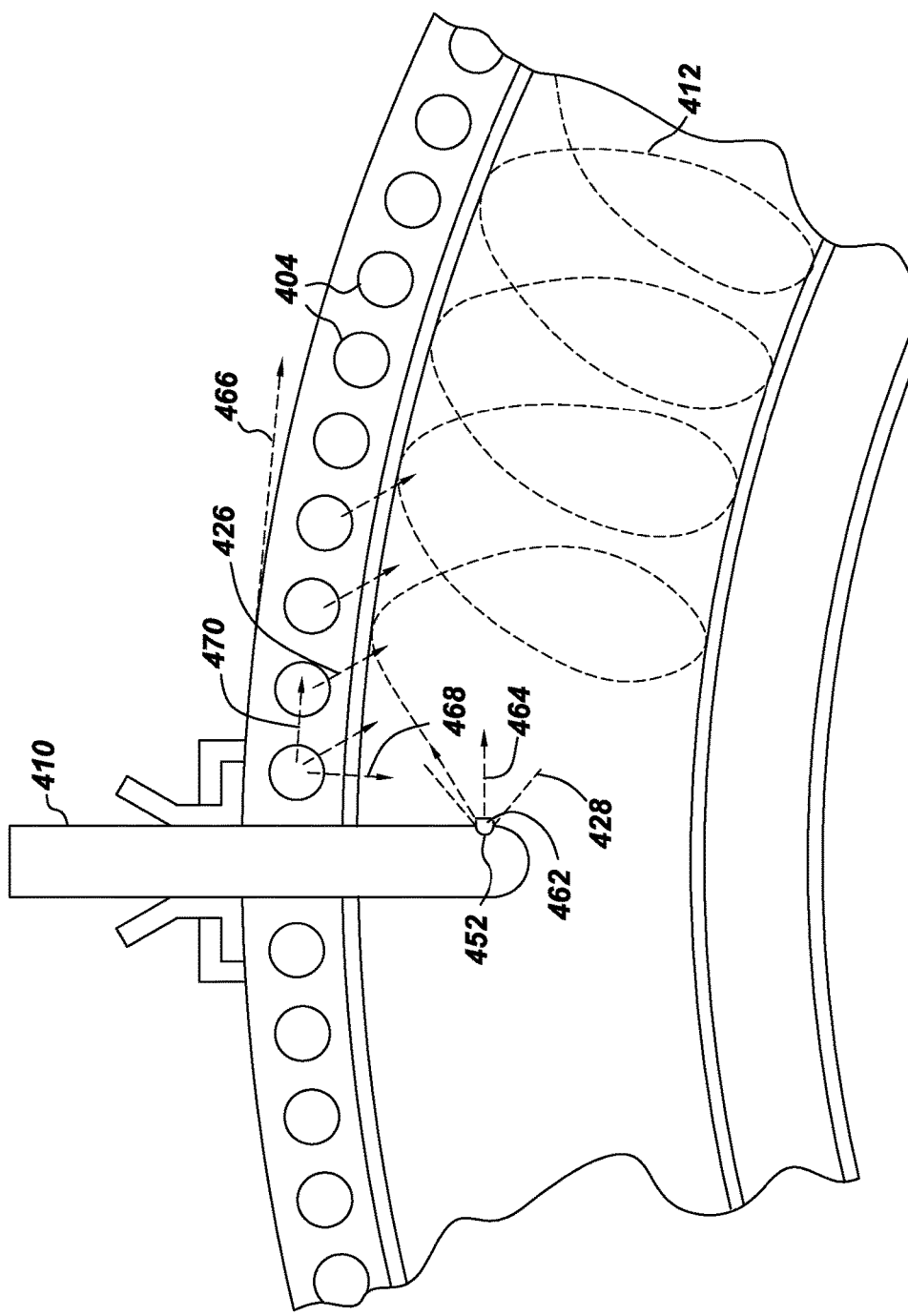
FIG. 4H is a cross sectional view of a portion of the combustion system shown in FIG. 4 in accordance with some embodiments of the present invention.

Referring to FIG. 4G, in some embodiments, an angle 442 between a central axis 438 of the vortex cavity 402 and a central axis 440 of the combustion chamber 108 may be varied to facilitate altering a swirl angle of the air/fuel mixture through the combustion chamber 108. The inventors have observed that altering the swirl angle of the air/fuel mixture through the combustion chamber 108 may eliminate the need to further turn the air flow as it exits the combustion chamber 108. Eliminating the need to further turn the air flow allows for a reduction of a length, or in some instances, elimination, of a turbine nozzle (first stage nozzle) that would otherwise be required to turn the air flow.

As discussed above, the inventors have observed that conventional turbine engines typically require multiple components (e.g., one or more guide vanes, diffusors, or the like) to change an orientation of a flow path of air to facilitate a desired flow path through the combustor. For example, referring to FIG. 5, a conventional gas turbine engine 500 may include an axial compressor 504, a centrifugal compressor 506, a diffusor 508, and an inner liner 512 and outer liner 502 that at least partially defines a combustor 510. In some embodiments, a casing 514 may be disposed about the outer liner 502. When present, the casing 514 and an outer portion 516 of the outer liner 502 may form an outer passage 518.

In operation, the axial compressor 504 receives air from an intake (not shown). The air is compressed and is received by the centrifugal compressor 506. The diffusor 508 receives the compressed air from the centrifugal compressor 506 and directs a desired portion of the compressed air to the combustor 510. In some variations the diffusor 508 may include one or more guide vanes (one guide vane assembly 520 shown) that functions to alter an angle of the air flow, reduce or eliminate a swirling component of the air flow and/or direct a desired portion of the air towards the combustor 510. The compressed air is mixed with a fuel and ignited within the combustor 510. Following ignition, the air is directed out of the combustor 510 and towards one or more turbines (e.g., partial view of one turbine rotor 526 shown) via a turbine nozzle 522 (stage one nozzle).

Figure 5:
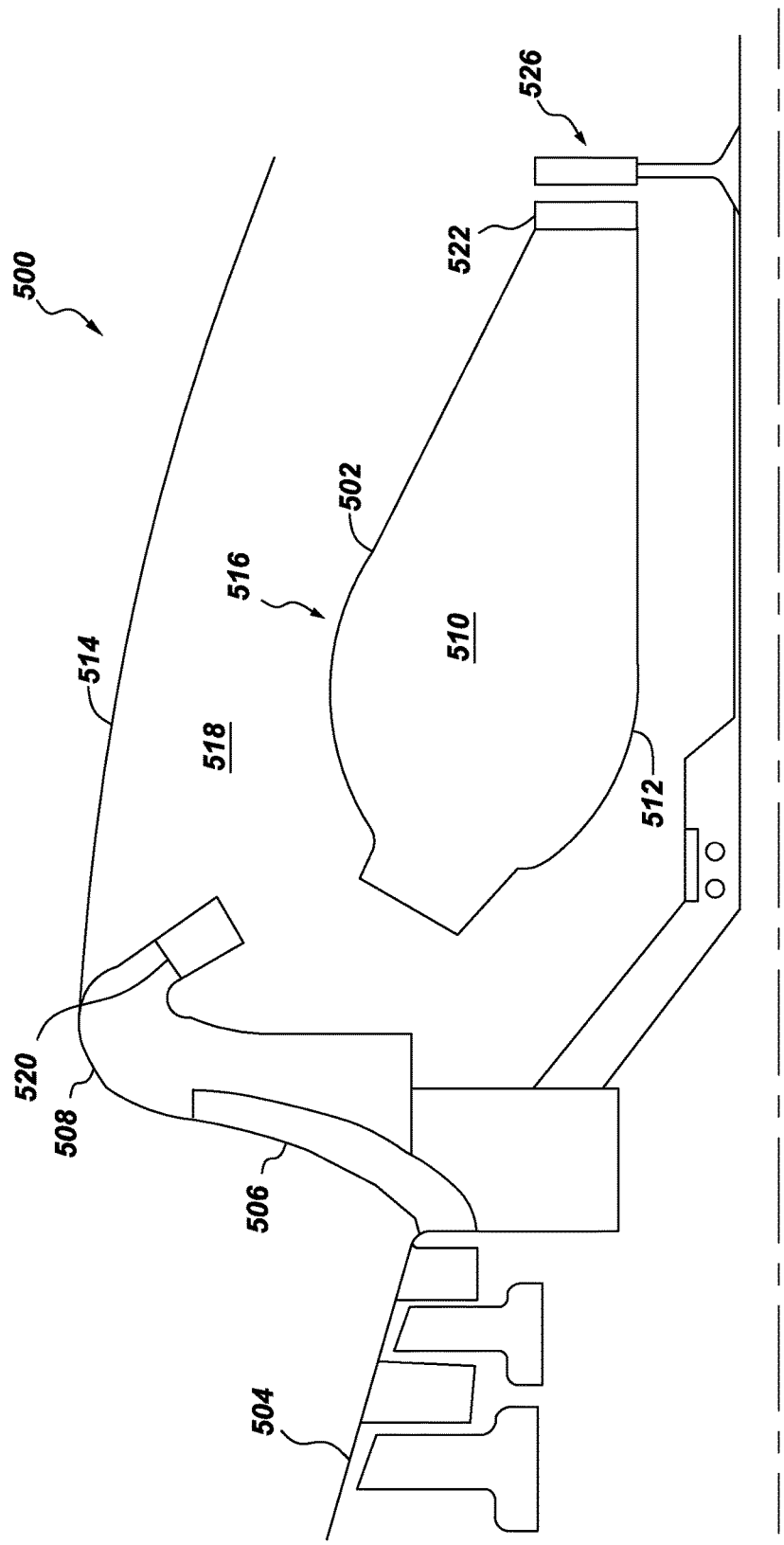
FIG. 5 is a cross sectional view of a conventional gas turbine engine combustion system.

The inventors have observed that providing the air radially (e.g., via the centrifugal compressor 506 and diffusor 508 as shown in FIG. 5) reduces the need for the orientation of the air flow to be altered (turned) prior to exiting the combustor, thereby increasing the efficiency of the turbine engine. However, the inventors have observed that such configurations still require one or more components (e.g., diffusor, guide vanes, turbine nozzle 522, or the like) to alter the flow of air to facilitate operation of the turbine engine.

Figure 5A:
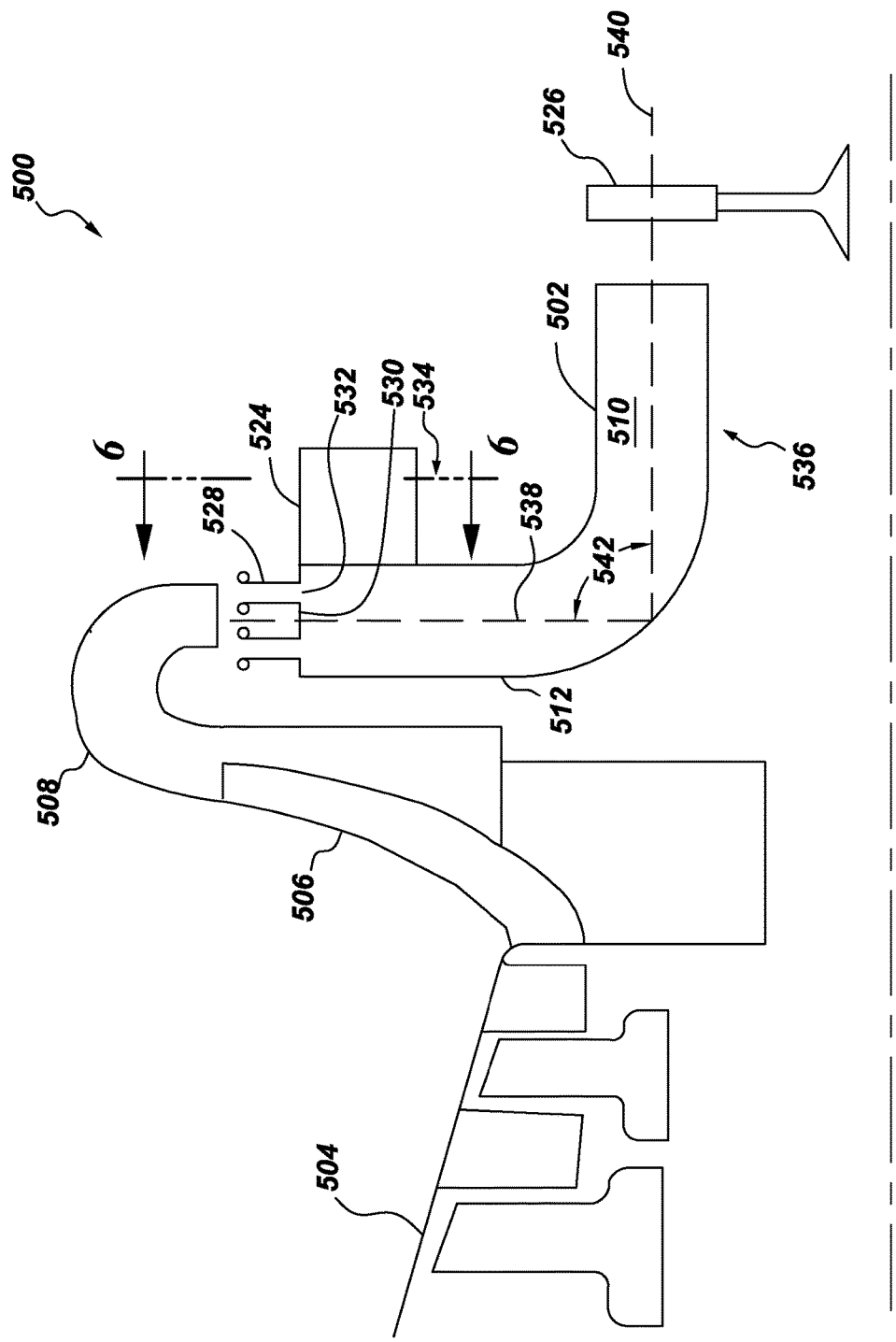
FIG. 5A is a cross sectional view of the combustion system shown in FIG. 5 in accordance with some embodiments of the present invention.

As such, referring to FIG. 5A in some embodiments, the inner liner 512 and outer liner 502 may be curved such that the combustor 510 comprises a first portion 534 fluidly coupled to a second portion 536, wherein a central axis 538 of the first portion 534 is offset from the central axis 540 of the second portion 536 by an angle 542. Configuring the combustor 510 in such a manner allows for an orientation and swirling component of the flow of air provided by the diffusor 508 to be maintained as it flows through the combustion chamber 506, thereby eliminating the need to further turn the air flow as it exits the combustion chamber 506. Eliminating the need to further turn the air flow allows for a reduction of a length, or in some instances, elimination, of a turbine nozzle (first stage nozzle) that would otherwise be required to turn the air flow prior to reaching the turbine 526. Moreover, configuring the combustor 510 such as shown in FIG. 5A reduces an overall length of the combustor 510, thereby providing a turbine engine having a reduced footprint. Reducing the size and/or eliminating the aforementioned components advantageously reduce the overall weight, cost and complexity of the turbine engine.

The first portion 518 and second portion 520 of the combustor 506 may be disposed in any position with respect to one another suitable to facilitate the aforementioned desired air flow. For example, in some embodiments, the central axis 514 of the first portion 518 may be offset from the central axis 516 of the second portion 520 by about 45 to about 180 degrees, or in some embodiments, about 90 degrees, such as shown in FIG. 5A.

In some embodiments, a cavity 524 may be fluidly coupled to the combustor 510. In some embodiments, the cavity 524 may be disposed directly in-line with the combustor 510 (such as indicated in phantom at 544) or disposed such that at least a portion of the cavity 524 is disposed on a side of the combustor 510 (such as indicated at 524). When present, the cavity 524 may be similar in configuration and function to the vortex cavity 402 described above. In some embodiments, the combustor 510 may include one or more guide vanes 528 configured to direct a desired flow of the compressed air provided by the diffusor 508 into the combustor 510 via one or more through holes 532 formed in a front wall 530 of the combustor 510 (e.g., similar to the one or more guide vanes 306 described above).

Figure 6:
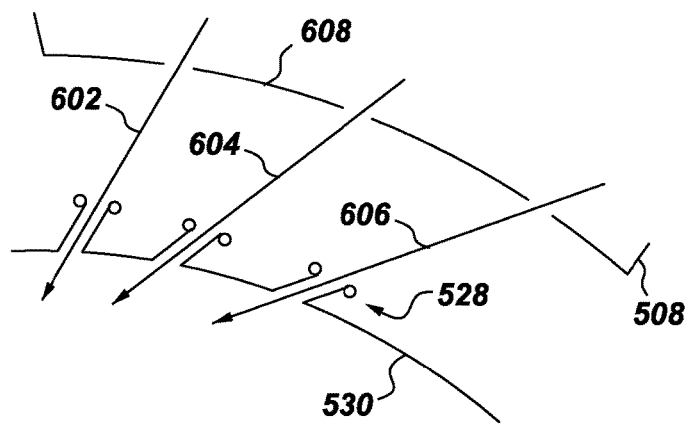
FIG. 6 is a cross sectional view of a portion of the combustion system shown in FIG. 5 in accordance with some embodiments of the present invention.

Referring to FIG. 6, in some embodiments, the front wall 530 may be curved to accommodate for a direction of air flow are various positions across the front wall 530 (e.g., air flow shown by arrows 602, 604, 606). In such embodiments, each of the guide vanes 528 may be angled to further accommodate for the direction of air flow. In some embodiments, the curvature of the front wall 530 and/or the orientation of each of the guide vanes 528 may be dependent on a curvature of the terminal end 608 of the diffusor 508 to facilitate an efficient capture of air provided by the diffusor 508.

Figure 7:
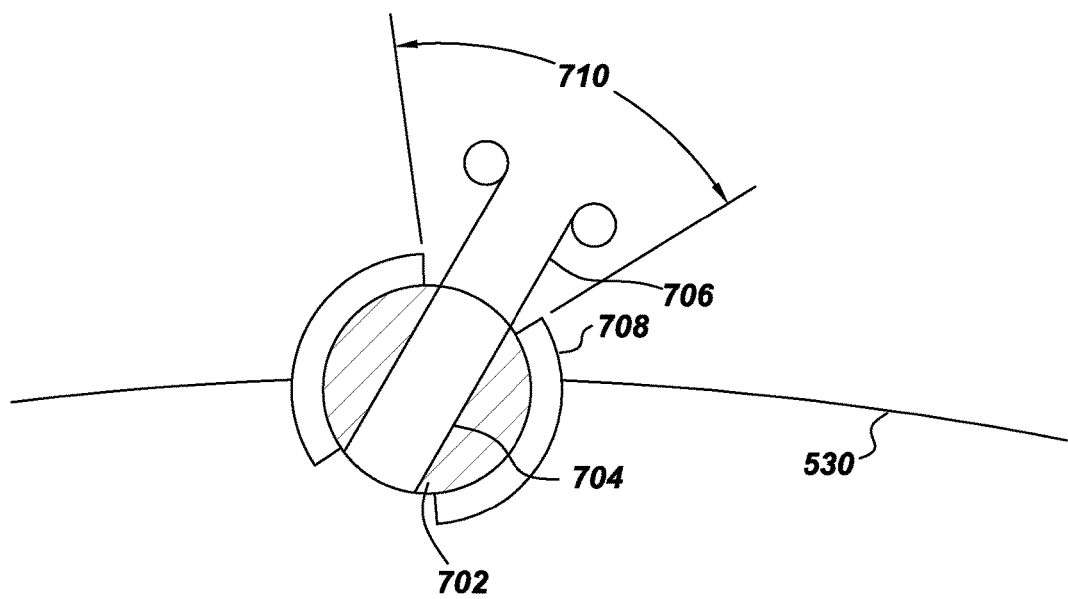
FIG. 7 is a cross sectional view of a portion of the combustion system shown in FIG. 5A in accordance with some embodiments of the present invention.

Alternatively, or in combination, in some embodiments, each guide vane 706 may be movable with respect to the front wall 530, for example such as shown in FIG. 7. In such embodiments, the guide vane 706 may be coupled to a spherical or cylindrical base 702 having a through hole 704 formed there through. The base 702 may be disposed within a collar 708 that is coupled to the front wall 530, thereby allowing the spherical base, and therefore the guide vane 706, to move in a direction and to a degree of freedom dictated by the collar 708 (movement shown by arrow 710). In some embodiments, the guide vane 706 may be moved mechanically, for example via a conventional actuator ring disposed about the turbine engine. Providing a movable guide vane 706 allows the guide vane 706 to accommodate for a changing direction in air flow, thereby providing additional degrees of freedom and an increased window of operability.

Thus, embodiments of a gas turbine engine have been provided herein. In at least some embodiments, the inventive gas turbine engine may reduce or eliminate one or more components typically utilized to direct a flow of air and/or fuel in a desired direction to facilitate operation of the gas turbine engine, thereby reducing cost, weight and complexity of the gas turbine engine. In addition, in at least some embodiments, the gas turbine engine may include an inventive vortex cavity that facilitates a helical flow of a fuel/air mixture that advantageously provides an improved and more efficient mixing and ignition of the fuel/air mixture and, thus, increasing the efficiency of the gas turbine engine.

Ranges disclosed herein are inclusive and combinable (e.g., ranges of "about 0 psi to about 25,000 psi", is inclusive of the endpoints and all intermediate values of the ranges of "about 0 psi to about 25,000 psi," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "some embodiments", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A combustor for a gas turbine engine, comprising:
   a combustion chamber having an inner volume defined at least partially by a front wall, an inner liner extending from the front wall, and an outer liner extending from the front wall;
   a vortex cavity extending between the front wall and the outer liner, the vortex cavity comprising a plurality of injection holes configured to direct an air flow into the vortex cavity to form a vortex, the vortex cavity comprising an open end in fluid communication with the inner volume of the combustion chamber, wherein the vortex cavity comprises three sides; and
   a fuel injector extending into the vortex cavity configured to inject fuel into the vortex to create a fuel-air mixture for combustion in the combustion chamber, wherein the vortex cavity comprises a first side on an aft side of the combustor, a second side, and a third side on a fore side of the combustor, the second side extending between the first side and the third side and defining a closed end of the vortex cavity.

2. The combustor of claim 1, wherein the fuel injector has a hole having an axis that is parallel to a tangential component of the vortex cavity.

3. The combustor of claim 2, wherein the hole comprises a nozzle configured to vary at least one of a flow rate, a pressure, or a direction of the fuel.

4. The combustor of claim 1, wherein the plurality of injection holes are configured to direct the air flow in a helical path.

5. The combustor of claim 1, wherein each of the plurality of injection holes includes a nozzle configured to vary at least one of a flow rate, a pressure, or a direction of the air flow.

6. The combustor of claim 1, wherein the vortex cavity further, comprises a plurality of protrusions extending into the vortex cavity to direct the air flow in a circular flow path.

\* \* \* \* \*